US010429711B2

(12) United States Patent
Luten et al.

(10) Patent No.: US 10,429,711 B2
(45) Date of Patent: Oct. 1, 2019

(54) ELECTRO-OPTIC INFRARED FILTER

(71) Applicant: Gentex Corporation, Zeeland, MI (US)

(72) Inventors: Henry A. Luten, Holland, MI (US);
Leroy J. Kloeppner, Jenison, MI (US);
Michael T. Stephenson, Holland, MI (US); Punam Giri, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 44 days.

(21) Appl. No.: 15/658,758

(22) Filed: Jul. 25, 2017

(65) Prior Publication Data

US 2018/0031940 A1 Feb. 1, 2018

Related U.S. Application Data

(60) Provisional application No. 62/366,830, filed on Jul. 26, 2016.

(51) Int. Cl.
*G02F 1/153* (2006.01)
*H04N 5/33* (2006.01)
(Continued)

(52) U.S. Cl.
CPC .............. *G02F 1/153* (2013.01); *G02F 1/15* (2013.01); *G09G 3/38* (2013.01); *H04N 5/33* (2013.01);
(Continued)

(58) Field of Classification Search
CPC ..... G02F 1/00; G02F 1/03; G02F 1/07; G02F 1/133308; G02F 1/133385; G02F 1/133526; G02F 1/1523; G02F 1/153; G02F 1/155; G02F 2203/11; G02F 2203/58; G09G 3/19; G09G 3/34; G09G 3/38; C09K 9/00; C09K 9/02; H04N 5/2254; H04N 5/33; H04N 5/332; H04N 5/7441; H04N 9/315; G03B 9/02
USPC ....... 359/245, 265, 269, 275, 321, 448, 609; 345/48, 49, 84, 105, 106, 204–206; 349/5, 58, 95, 158; 396/457, 506; 348/E5.028
See application file for complete search history.

(56) References Cited

U.S. PATENT DOCUMENTS 5,471,339 A * 11/1995 Ise .......................... G02F 1/155
359/269
5,805,330 A * 9/1998 Byker ................ G02F 1/13318
359/265
(Continued)

*Primary Examiner* — Loha Ben
(74) *Attorney, Agent, or Firm* — Price Heneveld LLP; Bradley D. Johnson

(57) ABSTRACT

An imaging system is provided that includes an imager, an optical lens stack, and an electro-optic element positioned between the imager and the lens stack. The electro-optic element includes a first substantially transparent substrate defining first and second surfaces. The second surface includes a first electrically conductive layer. A second substantially transparent substrate defines third and fourth surfaces. The third surface has a second electrically conductive layer. A primary seal is disposed between the first and second substrates. The seal and the first and second substrates define a cavity therebetween. An electro-optic medium is disposed within the cavity. The electro-optic medium is operable between substantially clear and substantially opaque states.

20 Claims, 2 Drawing Sheets

(51) Int. Cl.
   *G02F 1/15* (2019.01)
   *G09G 3/38* (2006.01)
   *G09G 3/19* (2006.01)
(52) U.S. Cl.
   CPC ...... *G02F 2203/11* (2013.01); *G02F 2203/58* (2013.01); *G09G 3/19* (2013.01)

(56) References Cited

U.S. PATENT DOCUMENTS

| | | | | |
|---|---|---|---|---|
| 6,055,089 A * | 4/2000 | Schulz | ............ | G02F 1/163 |
| | | | | 136/251 |
| 6,433,913 B1 * | 8/2002 | Bauer | ............ | G02C 7/101 |
| | | | | 156/107 |
| 6,621,616 B1 | 9/2003 | Bauer et al. | | |
| 6,667,471 B2 | 12/2003 | Bos et al. | | |
| 7,401,920 B1 * | 7/2008 | Kranz | ............ | A61B 3/113 |
| | | | | 351/209 |
| 7,535,614 B1 * | 5/2009 | Tapley | ............ | B60J 3/04 |
| | | | | 345/105 |
| 7,567,291 B2 | 7/2009 | Bechtel et al. | | |
| 7,855,755 B2 * | 12/2010 | Weller | ............ | B60R 1/12 |
| | | | | 349/11 |
| 8,179,236 B2 * | 5/2012 | Weller | ............ | B60R 1/12 |
| | | | | 340/425.5 |
| 8,632,034 B2 * | 1/2014 | Mitchell | ............ | B60J 3/04 |
| | | | | 244/129.3 |
| 9,176,357 B2 * | 11/2015 | Lam | ............ | B60J 3/04 |
| 9,354,470 B2 * | 5/2016 | Ash | ............ | G02F 1/1521 |
| 2004/0051930 A1 | 3/2004 | Wang | | |
| 2014/0224966 A1 | 8/2014 | Chung | | |

* cited by examiner

ELECTRO-OPTIC INFRARED FILTER

CROSS-REFERENCE TO RELATED APPLICATION

This application claims the benefit of and priority to U.S. Provisional Patent Application No. 62/366,830, filed on Jul. 26, 2016, entitled ELECTRO-OPTIC INFRARED FILTER, the entire disclosure of which is hereby incorporated herein by reference.

FIELD OF THE DISCLOSURE

The present disclosure generally relates to an infrared filter, and more particularly to an electro-optic infrared filter.

BACKGROUND

Imaging systems rely on the amount and wavelength of light entering an imager to create an image. Adjusting the amount and wavelength of light reaching the imager by conventional mechanical filtering systems may prove cumbersome and expensive. Accordingly, new systems of controlling the light which reaches an imager are desired.

SUMMARY OF THE DISCLOSURE

According to one aspect of the present disclosure, an imaging system is provided that includes an imager, an optical lens stack, and an electro-optic element positioned between the imager and the lens stack. The electro-optic element includes a first substantially transparent substrate defining first and second surfaces. The second surface includes a first electrically conductive layer. A second substantially transparent substrate defines third and fourth surfaces. The third surface has a second electrically conductive layer. A primary seal is disposed between the first and second substrates. The seal and the first and second substrates define a cavity therebetween. An electro-optic medium is disposed within the cavity. The electro-optic medium is operable between substantially clear and substantially opaque states for at least one wavelength band.

According to another aspect of the present disclosure, a vehicle imaging system is provided that includes an imager, an optical lens stack, and an electro-optic element positioned in the imaging system. The electro-optic element has a first substantially transparent substrate defining first and second surfaces and a second substantially transparent substrate defining third and fourth surfaces. A primary seal is disposed between the first and second substrates. The seal and the first and second substrates define a cavity therebetween and an electro-optic medium is disposed within the cavity. The electro-optic medium is operable between substantially transparent and substantially opaque states to at least one wavelength of infrared light.

According to yet another aspect of the present disclosure, a vehicle imaging system is provided that includes an imager, an optical lens stack, and an electro-optic element positioned in the imaging system. The electro-optic element has a first substrate defining first and second surfaces and a second substrate defining third and fourth surfaces. The first and second substrates are positioned in a spaced apart configuration and an electro-optic medium is positioned between the first and second substrates. The electro-optic medium is variably transmissive to at least one wavelength of infrared light.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION OF EMBODIMENTS

Figure 1:
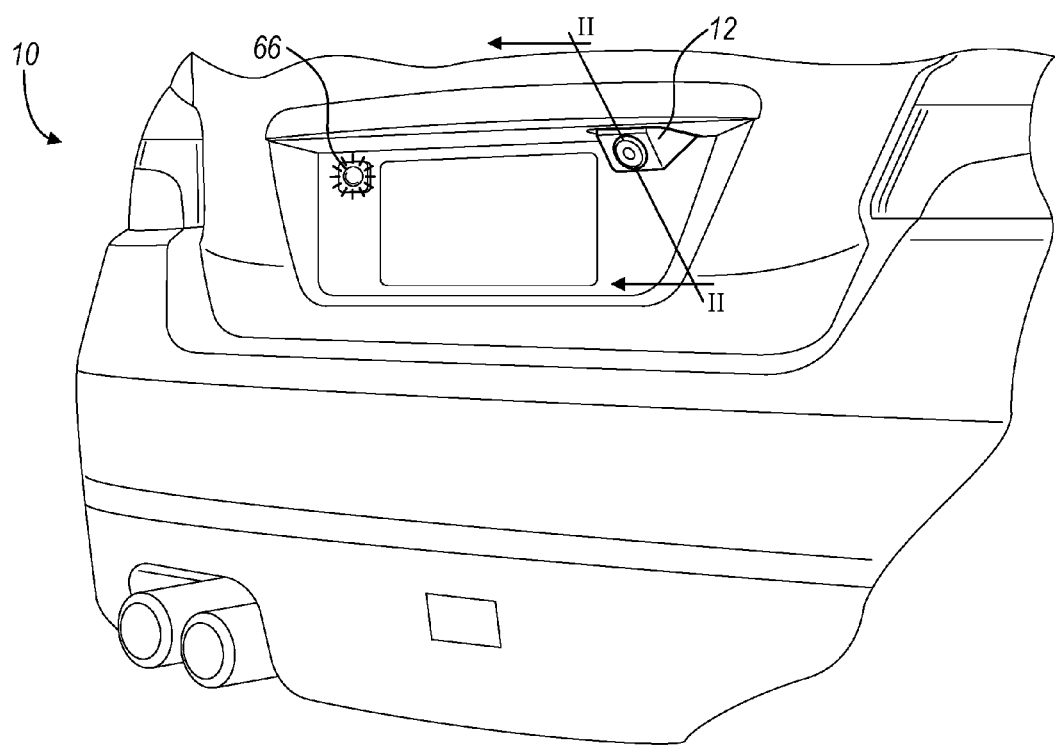
FIG. 1 is a rear perspective view of a vehicle incorporating an imaging system, according to one example of the disclosure.

The present illustrated embodiments reside primarily in combinations of method steps and apparatus components related to an electro-optic element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
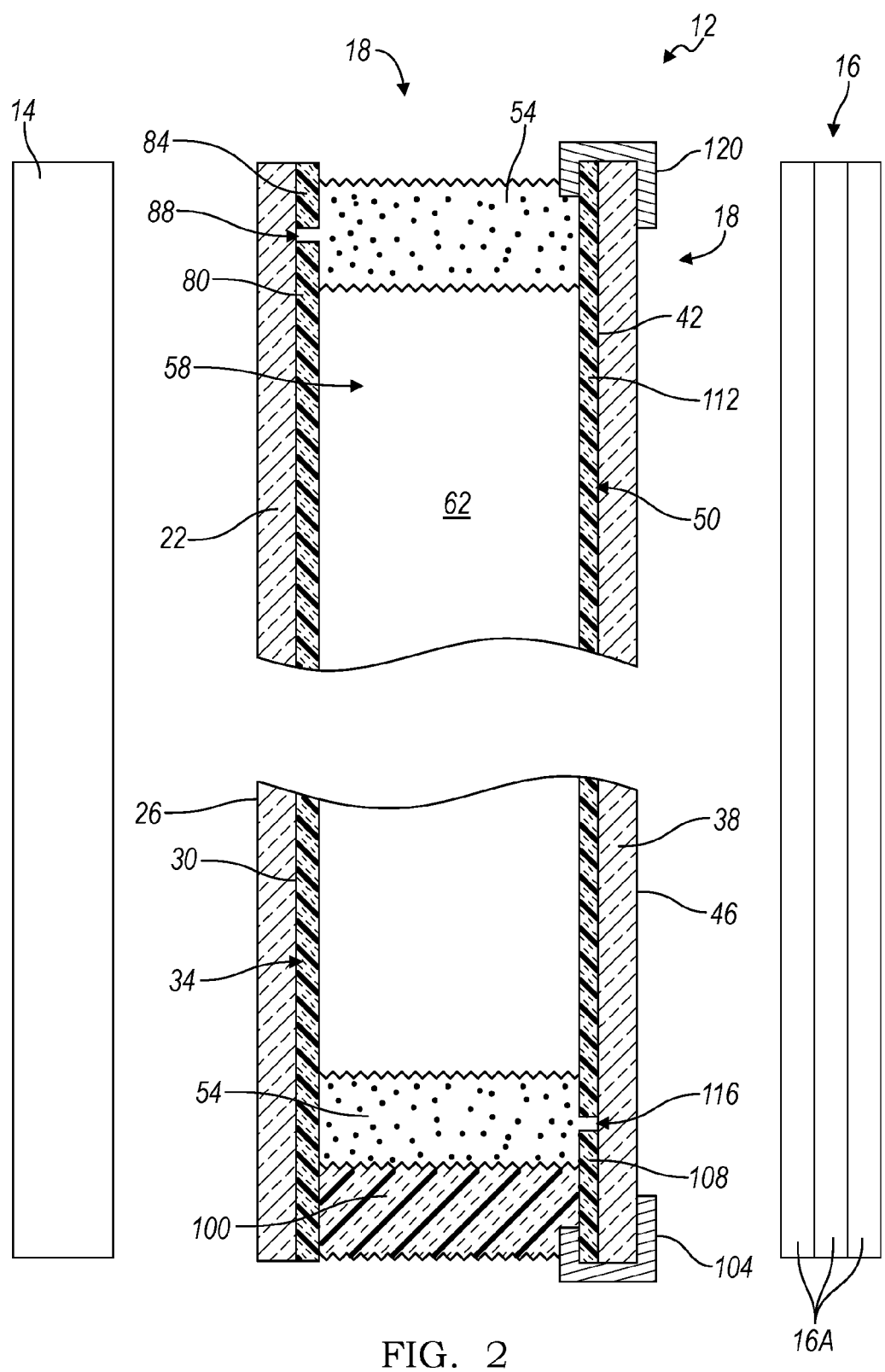
FIG. 2 is an exploded cross-sectional view of the imaging system of FIG. 1 taken at line II, according to one example of the disclosure.

Referring to FIGS. 1 and 2, a vehicle 10 includes an imaging system 12. The imaging system 12 includes an imager 14, an optical lens stack 16, and an electro-optic element 18. The electro-optic element 18 is positioned between the imager 14 and the lens stack 16. The electro-optic element 18 includes a first substantially transparent substrate 22 defining a first surface 26 and a second surface 30. The second surface 30 includes a first electrically conductive layer 34. A second substantially transparent substrate 38 defines a third surface 42 and a fourth surface 46. The third surface 42 includes a second electrically conductive layer 50. A primary seal 54 is disposed between the first and second substrates 22, 38. The seal 54 and the first and second substrates 22, 38 define a cavity 58 therebetween. An electro-optic medium 62 is disposed within the cavity 58. The electro-optic medium 62 is operable between substantially clear and substantially opaque states for at least one wavelength band.

Referring to FIG. 1, as shown, the imaging system 12 may be incorporated on the vehicle 10 (e.g., a car, truck, construction equipment, etc.) or may be used in other circumstances (e.g., baby monitor, rear view mirror systems, security system, night vision systems, camera, etc.) without departing from the teachings provided herein. In the depicted configuration, the imaging system 12 is configured to detect and produce an image of an area behind the vehicle 10 and transmit the image to a driver of the vehicle 10. In other examples, the imaging system 12 may be configured to face in a vehicle forward direction and produce an image of the area ahead of the vehicle 10. The vehicle 10 may include one or more light sources 66 configured to provide illumination to the area imaged by the imaging system 12. The light source 66 may emit visible light, non-visible light, and/or near-infrared light. In a specific example, the light source 66 may operate at a wavelength in the range of about 800 nm to about 950 nm.

According to various examples, the imaging system 12 may be configured to selectively remove one or more wavelength bands of light. The wavelength bands of light may be visible (e.g., about 350 nm to about 750 nm), near-infrared (e.g., about 750 nm to about 1400 nm), short infrared (e.g., about 1400 nm to about 3000 nm), mid-infrared (e.g., about 3000 nm to about 8 μm) and/or long-infrared (e.g., about 8 μm to about 15 μm). The selective removal of the wavelength bands of light may be carried out by switching the electro-optic element 18 (FIG. 2) between the substantially clear and substantially opaque states, as well as intermediate states thereto, as explained in greater detail below. When the electro-optic element 18 is in the transparent state, light of many wavelengths (e.g., visible and near-infra red) may pass through to the imager 14. In opaque states of the electro-optic element 18, the wavelength band or wavelength bands of light which contact the electro-optic element 18, may be substantially prevented from contacting the imager 14. If a low pass filter, such as a 700 nm cutoff filter, is employed, the imager 14 may be blind to near-infrared illumination from the light source 66. However, if a low pass filter is not present during normal daylight illumination, the near-infrared light present may degrade the color accuracy of the imager 14.

Referring now to FIG. 2, as explained above, the imaging system 12 includes the imager 14, the lens stack 16 and the electro-optic element 18. According to various examples, the electro-optic element 18 is positioned in the imaging system 12. The imager 14 may include one or more image sensors. An image sensor or imaging sensor, is a sensor that detects and conveys information that constitutes an image. Imaging sensors do so by converting the variable attenuation of light waves (as they pass through or reflect off objects) into signals or small bursts of current that convey the information. The waves can be light or other electromagnetic radiation. The image sensors of the imager 14 may include a charge-coupled device (CCD) and/or a complementary metal-oxide-semiconductor (CMOS). Conventional imaging sensors may include a color filter, such as a Bayer filter or a color filter array, which passes red, green, or blue light to selected pixel sensors, forming interlaced grids sensitive to red, green, and blue. Such conventional color filters may utilize organic dyes as the color filter which offer a cost effective solution. A potential disadvantage of organic dyes is that they may become transparent at the near-infrared wavelengths (e.g., greater than about 700 nm). Specifically, green and blue color filters may tend to leak light (i.e., allow more light than desired through the color filter). The result is that near-infrared light, which is abundant in sunlight and incandescent lamps, may cause a loss of color accuracy in the resulting image from the imager 14. Some conventional examples of imaging sensors may utilize a low pass filter configured to remove light or wavelengths equal to or greater than about 700 nm.

Positioned on an opposite side of the electro-optic element 18 from the imager 14 is the lens stack 16. The lens stack 16 may include lenses 16A. The lenses 16A may each be configured to shape or refract light the same or differently. In a specific example, the lenses 16A may be plastic molded lenses which are integrated inside a lens barrel. The lenses 16A may be mounted within a lens barrel and attached to the electro-optic element 18 and/or the imager 14. In a specific example, the electro-optic element 18 may be positioned within the lens barrel. According to some examples, the electro-optic element 18 may be positioned in the lens stack 16. For example, the lenses 16A may be positioned between the electro-optic element 18 and the imager 14. In other words, the electro-optic element 18 may be positioned between the lenses 16A of the lens stack 16 such that the lenses 16A are on both sides of the electro-optic element 18.

In the depicted configuration, light passes through the lens stack 16, through the electro-optic element 18, and onto the imager 14. The electro-optic element 18 includes the first substrate 22 having the front or first surface 26 and the second surface 30. The first surface 26 is the inward, or imager 14 facing side, of the electro-optic element 18. A first conductive electrode portion 80 and a second conductive electrode portion 84 are applied to the second surface 30 and cooperate to define the first electrically conductive layer 34. The first and second conductive electrode portions 80, 84 are substantially electrically insulated from one another via a first isolation area 88. The first isolation area 88 cooperates with a portion of the primary seal 54 to define the second conductive electrode portion 84. This configuration allows for placement of an electrically conductive material 100 (e.g., a first conductive epoxy) adjacent to the primary seal 54. A first electrical clip 104 is in contact with the electrically conductive material 100 and is further in electrical communication with a third conductive electrode portion 108 and the electro-optic medium 62 disposed within the cavity 58. Electrical energy is passed through the first electrical clip 104 and through the electrically conductive material 100 into the first electrically conductive layer 34.

The fourth surface 46 of the second substrate 38 is an outward facing side, or side facing the lens stack 16. It will be understood that the electro-optic element 18 may be reoriented such that the imager 14 receives light from the fourth surface 46 and the light enters the electro-optic element 18 through the first surface 26 without departing from the spirit of this disclosure. In addition, it should be noted that the first substrate 22 may be larger or smaller than the second substrate 38 to create an offset along at least a portion of the perimeter of the electro-optic element 18. The third conductive electrode portion 108 and a fourth conductive electrode portion 112 are shown proximate the third surface 42 and are electrically insulated via a second isolation area 116. The third and fourth conductive electrode portions 108, 112 cooperate to define the second electrically conductive layer 50. The second isolation area 116 cooperates with a portion of the primary seal 54 to define the fourth conductive electrode portion 112 that is substantially electrically insulated from the third conductive electrode portion 108. A second electrical clip 120 is in electrical communication with the fourth conductive electrode portion 112 and the electro-optic medium 62.

The primary seal 54 traverses an approximate perimeter of, and is configured to cooperate with, the first and second substrates 22, 38 to define the cavity 58 as substantially hermetic. The primary seal 54 may be applied to the first or second substrates 22, 38 by methods commonly used in the liquid crystal display (LCD) industry, such as by silk-screening or dispensing. The electro-optic medium 62 is disposed within the cavity 58.

According to at least one example, the electro-optic medium 62 is an electrochromic medium which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process For The Preparation Thereof and Use In Electrochromic Devices;" U.S. Pat. No. 6,519,072 entitled "Electrochromic Device;" and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety.

Further, as explained above, the electro-optic element 18 may be configured to be operable between substantially transparent, or clear, and substantially opaque states to one or more wavelength bands of light. According to various examples, the electro-optic medium 62 may be configured such that the opaque and transparent states of the electro-optic element 18 are relative to a specific wavelength or wavelength band of light. In one example, the electro-optic element 18 may be configured to attenuate the near-infrared band of the electromagnetic spectrum as disclosed in U.S. Pat. No. 6,193,912, entitled "Near Infrared-Absorbing Electrochromic Compounds and Devices Comprising Same," which is herein incorporated by reference in its entirety.

According to various examples, the electro-optic element 18 may have a transmissivity in the clear state, or substantially transparent state, of greater than 20%, 30%, 40%, 50%, 60%, 70% or 80% for near infrared light. In the substantially opaque state, the electro-optic element 18 may have a transmissivity of less than about 60%, 50%, 40%, 30%, 20%, 10%, 1% or 0.1% for near-infrared light. It will be understood that varying levels of transmissivity and opacity to near-infrared light may be obtained by partially transitioning the electro-optic element 18 between the substantially transparent and substantially opaque states.

According to various examples, the first, second, third and/or fourth surfaces 26, 30, 42, 46 include one or more antireflective layers or coatings. Antireflective coatings that may be used are disclosed in U.S. patent application Ser. No. 15/184,254, entitled "Heads Up Display System," now U.S. Pat. No. 10,101,583 which is herein incorporated by reference in its entirety.

Referring again to FIGS. 1 and 2, in use the electro-optic element 18 may be transitioned between the substantially transparent state and the substantially opaque state based on the lighting sensed by the imaging system 12. For example, during daylight, or high near-infrared light and visible light conditions, the electro-optic element 18 may be transitioned to the substantially opaque state to reduce the amount of near-infrared light reaching the imager 14. In another example, during low or night time conditions, the light source 66 may emit near-infrared light and the electro-optic element 18 may be transitioned to the substantially transparent state such that the light from the light source 66 reaches the imager 14. Such an example may be advantageous in that the light emitted from the light source 66 may reach the imager 14 and provide sufficient lighting for a discernable image to be formed and transmitted to a driver of the vehicle 10. It will be understood that the above described examples may be applied to circumstances where the imaging system 12 is not on the vehicle 10, but is rather configured as a security system, low light camera, or other disclosed uses of the imaging system 12.

Use of the present disclosure may offer several advantages. First, use of the electro-optic element 18 as a near infrared filter allows for the elimination of electro-mechanical filtering methods. As disclosed above, conventional imaging systems incorporating near-infrared filters may utilize large and/or expensive electromechanical systems to move the filter in and out of the imaging path of the imaging system. With the use of the present disclosure, a more compact imaging system is attainable which may have a smaller package space. Second, use of the present disclosure allows the creation of an imaging system having few, or no, moving parts. Third, use of the present disclosure allows for the variable transmission of near-infrared light adjusting an electrical signal provided to the electro-optic element 18. As such, the imaging system 12 may be utilized under bright conditions (e.g., sunny days or high ambient lighting) as well as in low light conditions where the light source 66 provides near-infrared lighting to illuminate the space where the imaging system 12 is imaging. Fourth, the use of the present disclosure may allow the amount of near-infrared light impinging the imager 14 to be continuously modulated such that varying amounts of near-infrared light may be added to the visible light to enhance contrast of the image with controlled, incremental loss of color resolution. This use may allow a continuous range of settings from essentially no near-infrared light and full color resolution, to maximum levels of near-infrared light and minimum color resolution.

Modifications of the disclosure will occur to those skilled in the art and to those who make or use the disclosure.

Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims by their language expressly state otherwise.

What is claimed is:

1. An imaging system, comprising:
   an imager;
   an optical lens stack; and
   an electro-optic element positioned between the imager and the lens stack, the electro-optic element comprising:
      a first substantially transparent substrate defining first and second surfaces, wherein the second surface comprises a first electrically conductive layer;
      a second substantially transparent substrate defining third and fourth surfaces, wherein the third surface comprises a second electrically conductive layer;
      a primary seal disposed between the first and second substrates, wherein the seal and the first and second substrates define a cavity therebetween; and
      an electro-optic medium disposed within the cavity, the electro-optic medium operable between substantially clear and substantially opaque states for at least one wavelength band.

2. The imaging system of claim 1, wherein the electro-optic element is substantially opaque to infrared light in the substantially opaque state.

3. The imaging system of claim 1, wherein the electro-optic medium is substantially transparent to visible light in the substantially opaque state.

4. The imaging system of claim 1, wherein the electro-optic medium is substantially opaque to a wavelength band of light having a wavelength greater than about 700 nm in the substantially opaque state.

5. The imaging system of claim 1, wherein the electro-optic medium is substantially opaque to a wavelength band of light having a wavelength greater than about 650 nm in the substantially opaque state.

6. The imaging system of claim 1, wherein the electro-optic medium is an electrochromic medium.

7. The imaging system of claim 6, wherein the optical lens stack comprises two or more lenses.

8. A vehicle imaging system, comprising:
an imager;
an optical lens stack; and
an electro-optic element positioned in the imaging system, the electro-optic element comprising:
a first substantially transparent substrate defining first and second surfaces;
a second substantially transparent substrate defining third and fourth surfaces;
a primary seal disposed between the first and second substrates, wherein the seal and the first and second substrates define a cavity therebetween; and
an electro-optic medium disposed within the cavity, wherein the electro-optic medium is in contact with an electrically conductive layer that is configured to adjust the electro-optic medium between substantially transparent and substantially opaque states to at least one wavelength of infrared light.

9. The vehicle imaging system of claim 8, wherein the electro-optic medium is substantially transparent to visible light when substantially opaque to infrared light.

10. The vehicle imaging system of claim 8, wherein the optical lens stack comprises two or more lenses.

11. The vehicle imaging system of claim 10, wherein the electro-optic element is positioned between the two or more lenses of the optical lens stack.

12. The vehicle imaging system of claim 8, wherein the electro-optic medium in the substantially opaque state is substantially opaque to light having a wavelength greater than about 700 nm.

13. The vehicle imaging system of claim 8, wherein the electro-optic medium in the substantially opaque state is substantially opaque to light having a wavelength greater than about 650 nm.

14. A vehicle imaging system, comprising:
an imager;
an optical lens stack; and
an electro-optic element positioned in the imaging system, the electro-optic element comprising:
a first substrate defining first and second surfaces;
a second substrate defining third and fourth surfaces, the first and second substrates positioned in a spaced apart configuration; and
an electro-optic medium positioned between the first and second substrates and in electrical communication with an electrically conductive layer, the electro-optic medium being variably transmissive to at least infrared light.

15. The vehicle imaging system of claim 14, wherein the electro-optic medium is an electrochromic medium.

16. The vehicle imaging system of claim 14, wherein the electro-optic element is positioned between the optical lens stack and the imager.

17. The vehicle imaging system of claim 14, wherein the electro-optic medium is substantially transparent to visible light.

18. The vehicle imaging system of claim 14, wherein the electro-optic medium is variably transmissive to a wavelength band of light having a wavelength greater than about 700 nm.

19. The vehicle imaging system of claim 14, wherein the electro-optic medium is variably transmissive to a wavelength band of light having a wavelength greater than about 650 nm.

20. The vehicle imaging system of claim 14,
wherein the electrically conductive layer is positioned on at least one of the second and third surfaces.

* * * * *